United States Patent
McKnight

(10) Patent No.: US 7,359,023 B2
(45) Date of Patent: *Apr. 15, 2008

(54) DISPLAY SYSTEM WITH PIXEL ELECTRODES SEPARATED FROM A COMMON ELECTRODE BY DIFFERENT OPTICAL DISTANCES

(75) Inventor: Douglas J. McKnight, Boulder, CO (US)

(73) Assignee: Compound Photonics U.S. Corporation, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/435,179

(22) Filed: May 9, 2003

(65) Prior Publication Data

US 2004/0004679 A1    Jan. 8, 2004

Related U.S. Application Data

(63) Continuation-in-part of application No. 09/797,540, filed on Feb. 28, 2001, now Pat. No. 6,636,287.

(51) Int. Cl.
  *G02F 1/1343* (2006.01)
  *G02F 1/1333* (2006.01)
(52) U.S. Cl. .................. 349/139; 349/146; 349/84
(58) Field of Classification Search ............... 349/84, 349/113, 139, 146
  See application file for complete search history.

(56) References Cited

U.S. PATENT DOCUMENTS 4,712,877 A * 12/1987 Okada et al. ............... 349/85
5,095,378 A * 3/1992 Suzuki ....................... 349/84
5,257,122 A * 10/1993 Dubal et al. ................ 349/85
5,897,187 A * 4/1999 Aoki et al. ................. 349/144
5,914,802 A   6/1999 Stappaerts et al. .......... 359/279
6,141,077 A * 10/2000 Hirata et al. ............... 349/143
6,195,140 B1 * 2/2001 Kubo et al. ................. 349/44
6,563,559 B2 * 5/2003 Noritake .................... 349/113
6,636,287 B1 * 10/2003 McKnight .................. 349/139
2001/0024257 A1 * 9/2001 Kubo et al. ................ 349/138
2001/0026343 A1   10/2001 Kubo et al. ................ 349/139
2001/0038434 A1   11/2001 Shigeta

FOREIGN PATENT DOCUMENTS

EP   1045272 A2   10/2000

OTHER PUBLICATIONS

Patent Cooperation Treaty, Jun. 9, 2004.

* cited by examiner

*Primary Examiner*—Mike Qi
(74) *Attorney, Agent, or Firm*—Baker Botts L.L.P.

(57) ABSTRACT

A display system comprises an electro-optic layer having first and second opposite major surfaces, a first electrode proximate the first surface of the electro-optic layer, and an electrode array. The electrode array includes a first plurality of pixel electrodes operatively coupled to the electro-optic layer proximate it's second surface and is separated from the first electrode by a first optical path length. The electrode array also includes a second plurality of pixel electrodes operatively coupled to the electro-optic layer proximate it's second surface and is separated from the first electrode by a second optical path length. The first and second pluralities of pixel electrodes form an irregular pattern.

5 Claims, 10 Drawing Sheets

DISPLAY SYSTEM WITH PIXEL ELECTRODES SEPARATED FROM A COMMON ELECTRODE BY DIFFERENT OPTICAL DISTANCES

CROSS-REFERENCE TO RELATED APPLICATIONS

This is a continuation-in-part of U.S. patent application Ser. No. 09/797,540 filed on Feb. 28, 2001 now U.S. Pat. No. 6,636,287 and entitled Display System With Pixel Electrodes.

FIELD OF THE INVENTION

The present invention relates to the field of display devices such as a liquid crystal display device, and more particularly to a display system wherein pixel electrodes having a first distance from a common electrode and pixel electrodes having a second distance from the common electrode form an irregular pattern.

BACKGROUND OF THE INVENTION

Liquid crystal displays can be either transmissive or reflective. Their basic construction consists of a liquid crystal material, which is a form of an electro-optic layer, between two substrate plates which have conducting electrodes on their inner surfaces. At least one of the electrodes is a transparent electrode, consisting of a high refractive index material such as indium tin oxide (ITO) placed on top of a transparent substrate such as plastic or glass, with a lower refractive index. Other layers of lower refractive index, such as a passivation layer and a polyimide alignment layer, may be placed on top of the ITO electrode. Because of the refractive index mismatch between these materials, a certain amount of reflection occurs at the interfaces between the liquid crystal and the ITO layer and between the ITO layer and the substrate material. This results in multiple reflections occurring inside the liquid crystal cell which can constructively or destructively interfere depending on the cell gap and the wavelength of the light. This causes highly visible and undesirable colored interference fringes appearing on the display when the cell gap is non-uniform, especially when the cell gap is relatively thin and the illumination spectrum consists of one or more narrow band peaks.

Liquid crystal displays, and in particular liquid crystal on silicon displays, can suffer from problems if the liquid crystal cell gap is made non-uniform during construction. Alternatively, the gap may be constructed uniformly but can subsequently be subjected to stress that can cause a distortion such that the cell gap is not uniform over the area of the liquid crystal display. Typically the liquid crystal layer is only a few microns thick, which is a distance scale that can result in optical interference patterns being formed with many light sources, including LED illumination. In a reflective liquid crystal cell, where the effect of non-uniformity is doubled, a change of the order of 0.2 microns is enough to cause an interference fringe. Indeed, this problem could be more serious than any other visible effect of the underlying cell gap non-uniformity, and so this phenomenon can result in a high reject rate. The fringes can be eliminated by making the cell gap extremely uniform, but this is difficult to achieve with a high yield using present day manufacturing techniques.

Fringes occur because optical interference inside the cell (sometimes enhanced by a polarization effect) changes the amount of light reflected from the display. This interference is a function of cell gap, so changes in cell gap (that would not otherwise be enough to cause problems in other ways) show up as changes in brightness. In certain displays, this change will be much worse for certain colors and so fringes may only be seen in images having those colors, such as red images. FIG. 1 is an illustration of this effect. The peaks on the curve 12 are separated by about 0.2 microns in cell gap, and the underlying intensity change as a function of thickness is small enough that a smooth variation of that amount would not typically be a problem. The graph 10 shows the red intensity as a function of the cell gap. Dot 14 on the curve 12 represents the red intensity for a particular pixel and the dot 16 represents the red intensity of a nearby pixel which would otherwise display the same red intensity as the pixel represented by the dot 14 except that the cell gap for this pixel differs from the cell gap of the pixel represented by dot 14. If these pixels are reasonably close together, then this is typically seen as an objectionable fringe. The fringes give a contour map of the cell gap, with the transition of light to dark representing 0.1 microns and a full fringe dark-light-dark representing 0.2 microns. Clearly it would be advantageous if these variations of the cell gap did not cause such visual artifacts.

Interference fringes, in general, are reduced by suppressing at least one of the reflections that are required to form two interfering beams. In a reflective display, the only component that can be suppressed is the reflective beam component from inside of the glass cover, where the transparent conductive electrode is located. Multi-layer coating techniques provide one way to reduce interference fringes. U.S. Pat. No. 5,570,213 describes a way to reduce the interference fringes by adding additional layers on either side of the ITO layer. These additional layers act as a broadband anti reflection coating which effectively refractive index matches the ITO layer to the substrate material on one side and the liquid crystal on the other side. While these layers will decrease the intensity of the observed interference fringes, they are not completely satisfactory because, being a birefringement material, the liquid crystal has two principal refractive index values and it is not possible to simultaneously index match to both of these indices over sufficiently broad spectral range. Furthermore, these anti reflection coatings can contain up to 20 different dielectric layers which can be quite expensive to manufacture.

A different approach to eliminate the colored fringes caused by cell gap variations is taken by U.S. Pat. No. 4,693,559. In this case the substrate is roughened with a plurality of depressions, prepared by etching or embossing. The thickness variation within each depression produces a color variation of substantially the entire color spectrum which the eye averages out to a neutral additive color mix since the depressions are relatively small in size. While this method is effective at eliminating fringes, it does introduce a considerable amount of light scattering due to the roughened surface. This roughened surface is the ITO layer. This would make this method unsatisfactory to use in optical configurations where light loss due to scattering cannot be tolerated, such as in projection applications.

A related approach cited in U.S. Pat. No. 5,418,635 adds a plurality of convex portions of two or more different heights formed from photoresist bumps and then covers them with a polymer resin film to give the surface a continuous wave shape without any flat portions. Because there are no flat portions between the top and bottom of the liquid crystal layer, the multiple reflections causing the interference colors cannot occur. While this method has been demonstrated to be effective in reducing interference colors, it suffers from the same scattering limitation of the previous example with the roughened surface.

U.S. Pat. No. 4,632,514 provides a different cell gap under the red, green and blue color filters which is proportional to the dominant wavelength of each of the filters. Thus each separate pixel for these three colors has a different cell gap. In one example from this patent, a 5.4 micron gap is provided under the red filter, a 4.8 micron gap under the green filter, and a 4.0 micron gap under the blue filter. Multiple cell gap color displays provide an improved contrast and viewing angle compared with color displays only having a single cell gap. In this prior patent, the cell gaps themselves are designed to be proportional to the dominant wavelength of each of the filters and thus this design is limited to use in a color display and would not be useful in color displays where colors are generated by other methods, such as time sequential color. Similarly, this prior approach is not useful for monochrome panels that are used in "3-panel" systems where color is generated with 3 monochrome panels, each illuminated with a different color.

SUMMARY OF THE INVENTION

According to an aspect of the invention, there is provided a display system comprising an electro-optic layer having first and second opposite major surfaces, a first electrode proximate the first surface of the electro-optic layer, and an electrode array. The electrode array includes a first plurality of pixel electrodes operatively coupled to the electro-optic layer proximate the second surface and is separated from the first electrode by a first optical path length. The electrode array also includes a second plurality of pixel electrodes operatively coupled to the electro-optic layer proximate its second surface and separated from the first electrode by a second optical path length. The first and second pluralities of pixel electrodes form an irregular pattern.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

The present invention can be used in many different types of displays including both passive and active matrix type liquid crystal displays. The present invention is particularly useful with liquid crystal displays formed on integrated circuit substrates with reflective pixel mirrors. These types of displays are referred to as LCOS displays (liquid crystal on silicon). Various examples of such displays are known in the prior art. For example, U.S. Pat. No. 6,078,303 describes in detail circuits and methods for display systems, and particularly circuits and methods for display systems which drive a LCOS display with a time sequential color method. U.S. Pat. No. 5,426,526 also describes the various circuitry in the integrated circuit which includes the pixel electrodes which act as pixel mirrors in this type of display. Typically, LCOS displays are reflective displays and they may be micro displays which are designed to create a small image on the integrated circuit which is then magnified. The present invention may be used with such displays. Alternatively, the present invention may be used with transmissive displays and with other types of electro-optic material other than liquid crystals. The present invention may be used with monochrome displays, time-sequential color displays, or spatial color displays. The above referenced U.S. Patents (U.S. Pat. Nos. 5,426,526 and 6,078,303) are hereby incorporated herein by reference.

Figure 1:
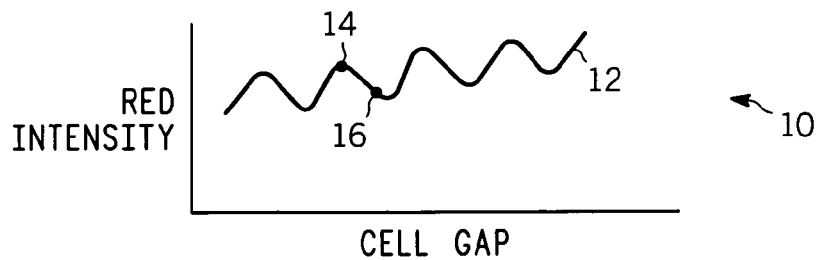
FIG. 1 shows a graph which indicates the modulation of light due to interference of the intensity reflected from a liquid crystal cell as a function of cell gap.
Figure 2:
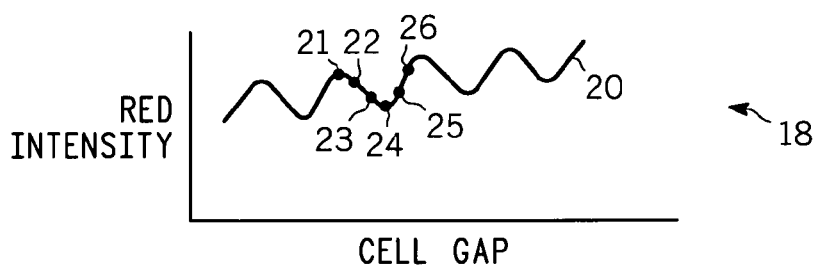
FIG. 2 is a graph showing the modulation due to interference fringes with various marks to illustrate that two different paths lengths can be spatially averaged together to reduce the effect of this modulation.

FIG. 2 illustrates conceptually how certain embodiments of the present invention function to reduce the fringe interference. In certain embodiments, each pixel is constructed to sample two points on the curve of intensity versus cell gap, such as the curve 20 shown in graph 18 of FIG. 2. Thus, for example, a first pixel may sample the curve 20 at points 21 and 24, while a second pixel may sample the curve at points 22 and 25 while a third pixel samples the curve at points 23 and 26. For each of these pixels, these two samples can be just averaged together (by spatial averaging) and thus this FIG. shows that the fringe interference is largely suppressed by this technique. Thus, in certain embodiments, at least two different optical path lengths are distributed over the display in closely adjacent regions, such as the same pixel. In certain embodiments the path length difference is chosen so that a maximum in the interference along one optical path length is a minimum interference along another path length. By placing these two path lengths in close proximity on a display, the eye will only respond to the average of these two intensities which remains substantially constant regardless of cell gap variations. In one embodiment, two optical paths are provided for each pixel in a reflective display by dividing each pixel into two regions of substantially equal area by providing a reflector under the pixel having two different levels. This arrangement results in two different cell gaps within the pixel. To effectively average out the fringes, the difference in the cell gap in certain embodiments should be approximately an odd multiple of a quarter wavelength of light within the liquid crystal material. Thus a cell gap difference of 0.1 microns, 0.3 microns, or 0.5 microns would be effective, but 0.1 microns is preferred because it provides fringe suppression over a wider range of wavelengths and makes it easier to manufacture the display.

Figure 3A:
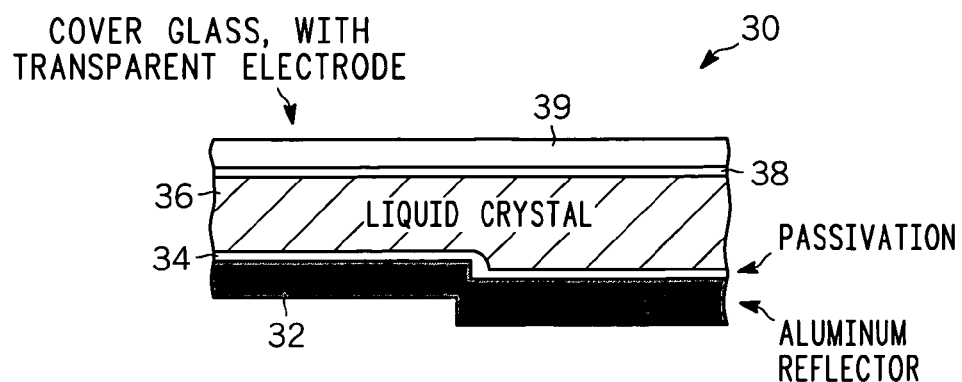
FIG. 3A shows a cross-sectional view of one pixel of one embodiment of a display system of the present invention.

FIG. 3A shows one embodiment of a display system of the present invention. In this cross-sectional view of FIG. 3A, the display device 30 includes a liquid crystal layer 36 which is sandwiched between an ITO layer 38 and an optional passivation layer 34. The ITO layer 38 has been applied to a cover glass 39. The passivation layer 34 is disposed above a pixel electrode 32 which also acts as a reflector. Thus, the display 30 represents an example of a liquid crystal display device which is a reflective device. The aluminum reflector is also the pixel electrode which controls the liquid crystal in order to produce a particular optical state for the pixel. It will be understood that in the case of a LCOS display that the pixel electrode 32 will be disposed above a semiconductor substrate, such as a silicon integrated circuit which includes the various circuitry used to control each pixel electrode. As noted above, U.S. Pat. Nos. 6,078,303 and 5,426,526 describe various examples of LCOS display devices and the circuitry used in those display devices for controlling pixel electrodes. It can be seen from FIG. 3A that each pixel electrode has a stepped surface such that there are two upper surfaces of the pixel electrode and thus two different distances between the surface of the pixel electrode and the opposing electrode, which in this case is the ITO layer 38. If the step is made such that the difference in height between the two surfaces of the pixel electrode is approximately 0.1 microns, then, as noted above, this will tend to cancel or suppress the fringe modulation. In the example of FIG. 3A, the path length change is achieved in this case simply by achieving the change in the liquid crystal cell gap, which is the gap between the ITO layer 38 and the upper surface of the aluminum reflector, which is the pixel electrode 32.

Figure 3B:
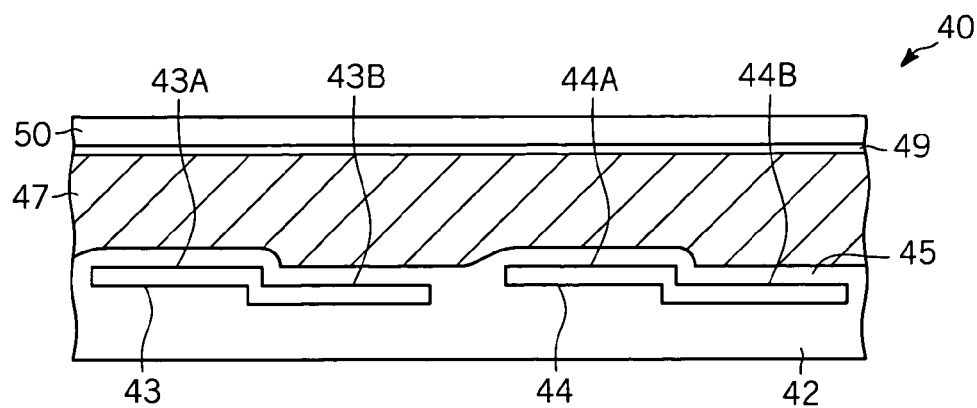
FIG. 3B shows a cross-sectional view of two adjacent pixels, where the pixel electrodes are similar to the type shown in FIG. 3A.

The stepped pixel electrode 32 may be fabricated by changing the thickness of a portion of each pixel electrode (e.g. by applying a mask which partially covers each pixel electrode and by etching away the exposed portion of the pixel electrode or by depositing the pixel electrode on an underlying substrate which has been processed to have different levels). Typically, a passivation layer would be applied on top of the pixel electrode, such as passivation layer 34, and then this is typically followed by the alignment layer such as a polyimide, as is well known in the art. As noted above, the pixel electrode may be deposited on an underlying substrate which has been processed to have different levels. One method for performing this is to etch the dielectric which is to receive the metal pixel electrode to provide steps in the dielectric. This may be accomplished by masking portions of the dielectric with a photoresist and by etching the exposed portions of the dielectric while the other portions are protected by the photoresist mask. The photoresist mask can then be removed and then the metal deposited into the stepped substrate. Following the deposition of the metal pixel electrodes, a spin-on glass is applied to fill the gaps between pixel electrodes and then an etch back is performed which stops at the detection of the metal pixel electrodes and then a final passivation layer is applied. Either method may be used to produce the structure shown for the particular pixel electrode 32 shown in FIG. 3A. FIG. 3B shows another cross-sectional view of a display 40 which is similar to the display 30 except that two adjacent pixel electrodes 33 and 34 are shown on the upper surface of the substrate 42 which may be an integrated circuit such as the integrated circuits described in U.S. Pat. No. 6,078,303 or U.S. Pat. No. 5,426,526. Thus it will be appreciated that interconnections to the pixel electrodes 43 and 44, while not shown, do exist to the pixel electrodes in order to control the liquid crystal layer 47 to provide optical states for each of these two pixels. The pixel electrodes 43 and 44 each include two pixel electrode surfaces which have different heights or distances relative to the ITO transparent electrode 49 which is attached to the cover glass 50. Thus two different optical lengths exist for each pixel. As shown in FIG. 3B, the pixel electrode 43 includes a first pixel electrode surface 43A and a second pixel electrode surface 43B. Similarly, pixel electrode 44 includes a first pixel electrode surface 44a and a second pixel electrode surface 44b. These surfaces are covered by a passivation layer 45 which is similar to the passivation layer 44 of FIG. 3A.

Figure 4:
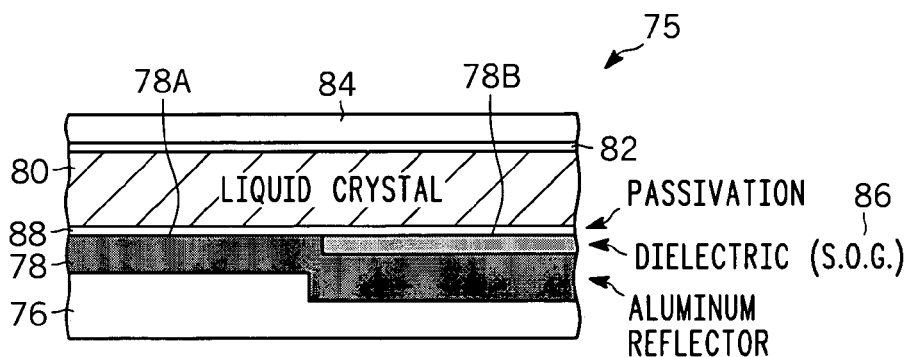
FIG. 4 is an alternative embodiment of the display system shown in FIG. 3A in which the pixel electrode is stepped, and then planarized to provide a substantially flat surface for the LC, and hence a substantially uniform cell gap.

FIG. 4 shows another example of a display system according to one embodiment. FIG. 4 shows a stepped pixel electrode 78 which represents a single pixel electrode on a substrate 76. It will be appreciated that there are typically many such stepped pixel electrodes on the substrate 76 so that the display includes many pixels which can be used to form a multipixelated image. Similarly, it will be appreciated that FIGS. 5 and 6, while showing a single pixel electrode, also can be considered to depict a portion of a display system which includes multiple such pixel electrodes disposed on a plane over a substrate, such as an integrated circuit as in the case of a LCOS display device in which the substrate is an integrated circuit containing the circuitry which drives the various pixel electrodes. Returning to FIG. 4, it can be seen that the stepped pixel electrode 78 has a first pixel electrode surface which is closer to an opposing electrode, which may be an ITO layer 82, than a second pixel electrode surface. In particular, pixel electrode surface 78A is closer to the ITO layer 82 than pixel electrode surface 78B. A dielectric layer 86 which may be a spin-on glass (SOG) is disposed above the pixel electrode surface 78B so that the resulting top surface of the substrate 76 is substantially flat. This allows the passivation layer 88 to also be substantially flat, which improves the performance of a liquid crystal display in many cases. Light traveling through the two different regions defined by the two pixel electrode surfaces will have two different optical path lengths. That is, light traveling in the vicinity of the pixel electrode surface 78A will have a shorter optical path length than light traveling toward and then away from the pixel electrode surface 78B.

One method for fabricating the display device 75 shown in FIG. 4 will now be described. Conventional semiconductor fabrication processing may be utilized to create the circuits in an integrated circuit which will serve as the substrate for a LCOS display in the substrate 76. Prior to depositing the metal pixel electrode layers, the underlying dielectric which serves as the surface for the pixel electrodes is step etched in order to create steps in this dielectric which is typically an intermetal dielectric. A technique for creating this step etch has been described above. Then the aluminum pixel electrode material is deposited onto the intermetal dielectric which has been etched to create the steps necessary for each pixel electrode. Then a spin-on glass is applied, and an etch back of the spin-on glass is performed, and this etch back stops when the metal "signature" of the high portions of the pixel electrode metal, such as pixel electrode surface 78A, are detected and this stopping of the etch back leaves some spin-on glass on top of the lower pixel electrode surfaces, such as pixel electrode surface 78B. Then a passivation deposition is done to apply the passivation layer 88, which could, for example, be a thin layer of SiO2. Next, an ITO layer 82 is applied to a glass substrate 84 to create a counter electrode on the glass substrate 84. Spacers are applied around the periphery of the display device in order to define the space between the passivation layer 88 and the ITO layer 82. Then a liquid crystal material 80 is injected into the space between the passivation layer 88 and the ITO layer 82. It will be appreciated that in many embodiments, a conventional liquid crystal alignment layer may be applied to both the passivation surface 88 and the ITO layer 82 in order to cause the liquid crystal to align in a desired state, as is well known in the art.

Figure 5:
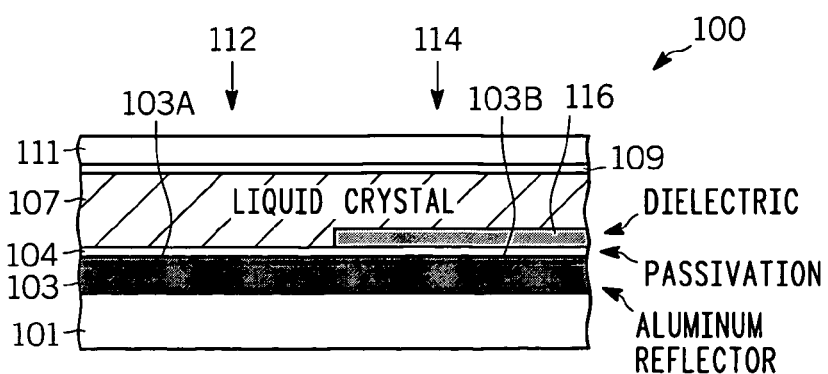
FIG. 5 shows another alternative embodiment of a display system of the present invention.

FIG. 5 shows another embodiment of a display system according to another embodiment of the present invention. Display system 100 includes a substrate 101 which may be an integrated circuit in the case of an LCOS display device. A typical LCOS display device would normally use a single crystal silicon substrate to fabricate the integrated circuits therein as is well known in the art. The integrated circuitry, as is known in the art, is coupled to each of the various pixel electrodes on the upper surface of the substrate. A single pixel electrode 103 is shown in FIG. 5 but it will be appreciated that there are typically many such pixel electrodes in a plane on the upper surface of the substrate 101. Each pixel electrode surface includes a first surface 103A and a second surface 103B. In this case, the pixel electrode 103 is substantially flat at its upper surface. Thus, this pixel electrode appears to be a conventional pixel electrode surface which is found on conventional LCOS display devices. However, a portion of the pixel electrode is covered by a dielectric 116 so that an optical path length into and back from the aluminum reflector surface of the pixel electrode 103 is different depending upon the particular surface that the light strikes. This can be seen by examining the optical path of light 112 compared to the optical path of the light 114 as shown in FIG. 5. In particular, for a reflective display, light enters at path 112 and passes through the glass substrate 111 and through the ITO layer 109 and through the liquid crystal 107 and through the passivation 104 and strikes the surface 103A and is reflected back through layers 104, 107, 109, and 111. This optical path is different than the optical path taken by light path 114 because of the optical nature of the dielectric 116 which is disposed over the pixel electrode surface 103B. Typically, this dielectric 116 has a significantly different refractive index from the liquid crystal's refractive index in order to provide a sufficiently different path length associated with the two different pixel electrode surfaces 103a and 103b. If the difference between the refractive index of the dielectric 116 and the refractive index for the liquid crystal 107 is small, then the thickness of the dielectric 116 can be increased to accumulate the optical path difference. Of course each of the pixel electrode surfaces 103A and 103B can be coated with the dialectic 116 as long as the thicknesses of the two dielectric coatings are sufficiently different to achieve the desired optical path length difference. In some cases it may be advantageous to place the dielectric 116 on top of the ITO electrode 109 of the upper glass substrate 111 instead of the pixel electrode 103 of lower substrate 101. The effect of reducing fringes will be the same but under some circumstances this alternate design may be easier to fabricate.

Figure 6:
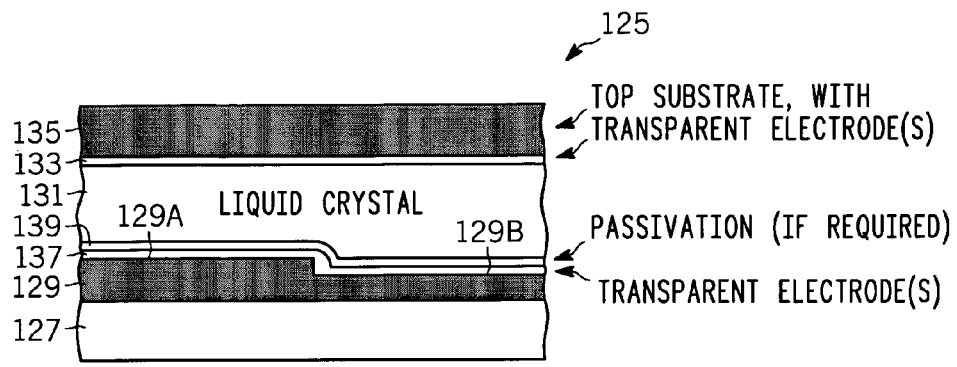
FIG. 6 shows an alternative display system of the present invention in which a pixel electrode is transparent and is stepped to provide different distances relative to a common transparent electrode, such as an ITO layer on the top substrate.

FIG. 6 shows another embodiment of a display system according to the present invention. Display device 125 may either be a transmissive display (if the layer 129 is transparent) or it may be a reflective display device if the layer 129 is reflective. The display device 125 includes a glass substrate 135 and a transparent electrode layer 133, which may be an ITO layer. A liquid crystal layer 131 is disposed between the ITO layer 133 and the passivation layer 139. As noted above, the ITO layer 133 and the passivation layer 139 will typically include an alignment layer in cases where the liquid crystal 131 requires an alignment for its display properties. A transparent electrode, such as another ITO layer 137, is disposed between the passivation layer 139 and the layer 129 which includes two surfaces 129a and 129b which have different distances relative to the ITO layer 133. In the case of a reflective display device, the layer 129 is a stepped mirror for each pixel, and there will typically be a dielectric layer which isolates the transparent electrode layer 137 from the reflective mirror layer 129 if the layer 129 is a mirror. In an alternative embodiment, the layer 129 may be a transparent material which is not conductive and which merely provides the stepped surface for the transparent electrode layer 137. The substrate 127 may be a thin film transistor substrate such as those used in conventional notebook computers with liquid crystal displays (such as the Macintosh PowerBook G3 computer from Apple Computer, Inc.). An alternative embodiment of the display device 125 may have the same structure as shown in FIG. 6 except that an extra passivation layer is applied above the stepped surface 129b, above the transparent electrode 137 so that the underlying surface on which the passivation layer 139 rests is substantially flat. This is similar to the embodiment shown in FIG. 4 in which the dielectric 86 creates a substantially flat surface over the entire pixel electrode 78, and thus the passivation layer 88 is substantially flat.

A method for choosing the magnitude of the optical path length difference will now be described. The optical response of a display cell configuration as a function of cell gap, at the wavelength of interest, is calculated or measured at cell gaps surrounding the cell design. Calculations may be performed with commercial liquid crystal modeling software such as DIMOS (from Autronic Melchers). From these measurements or calculations, one can determine the change in optical path that moves a peak into a trough. This change is typically the desired optical path length change. In many situations, this will simply result in a quarter wave of optical path length difference. For example, if the wavelength of interest is red light at 630 nanometers (nm), and the refractive index of the medium in which the extra optical path length is formed is 1.5, then the resulting thickness of this piece of material is 630 nm÷(4×1.5)=105 nm. If the path length changes are formed by extra distance in the birefringence liquid crystal media (such as in the display system shown in FIG. 3A), then this is, in principle, different from forming the extra path length in an isotropic material such as a spin-on glass (such as the display system shown in FIG. 4). In practice, the differences are usually small enough to be neglected because the SOG and liquid crystal have similar refractive indices, but either fabrication technique can be exactly accounted for in the modeling software.

There are also solutions that result from moving a peak of the curve into a trough that is not immediately adjacent to it. These solutions occur close to odd multiples of a quarter wavelength of the light (e.g. three times a quarter of a wavelength or five times a quarter of a wavelength, etc.). The disadvantage of these higher order solutions is that their effect diminishes more rapidly with a change in wavelength than a solution which is at approximately one quarter of a wavelength. They are worth considering if, for example, there is a convenient fabrication technique easily available to make path length differences close to one of these solutions. Another reason for considering higher order solutions is that they can, in principle, be used to provide fringe canceling at more than one wavelength. For example, a path length difference of 7 times one quarter of a wavelength at 450 nm is also a path length difference of 5 times a quarter wavelength at 630 nm. At even higher orders, similar phenomena occur (a path length difference of 13 times one quarter of a wavelength of 450 nm is also 11 times one quarter of a wavelength at 532 nm, and 9 times one quarter of a wavelength at 650 nm). Hence, it is possible to cancel fringes at multiple wavelengths simultaneously with only two path lengths.

An analysis shows that in general the amplitude of the modulation caused by interference is itself a function of cell gap. One example of this is where the amplitude of the fringes decreases with increasing cell gap, due to the coherence of the light source. If this effect is considered significant, it is possible to apply a correction by biasing the relative areas of the pixel regions. In this example where the fringe amplitude decreases with increasing gap, the correction would be to slightly increase the area of the pixel which has the longer optical path length. By doing this, one can achieve better cancellation because the effect of less modulation over the larger area better balances the effect of the larger modulation over the smaller area, when the pixel integrated by the human eye. Clearly, this technique can be used to spatially integrate contributions from more than two optical paths. This may be analyzed using the same method as above, by adding the curves from multiple contributions. This could be done for situations in which the suppression of fringes over a wider wavelength range is desired.

Figure 7:
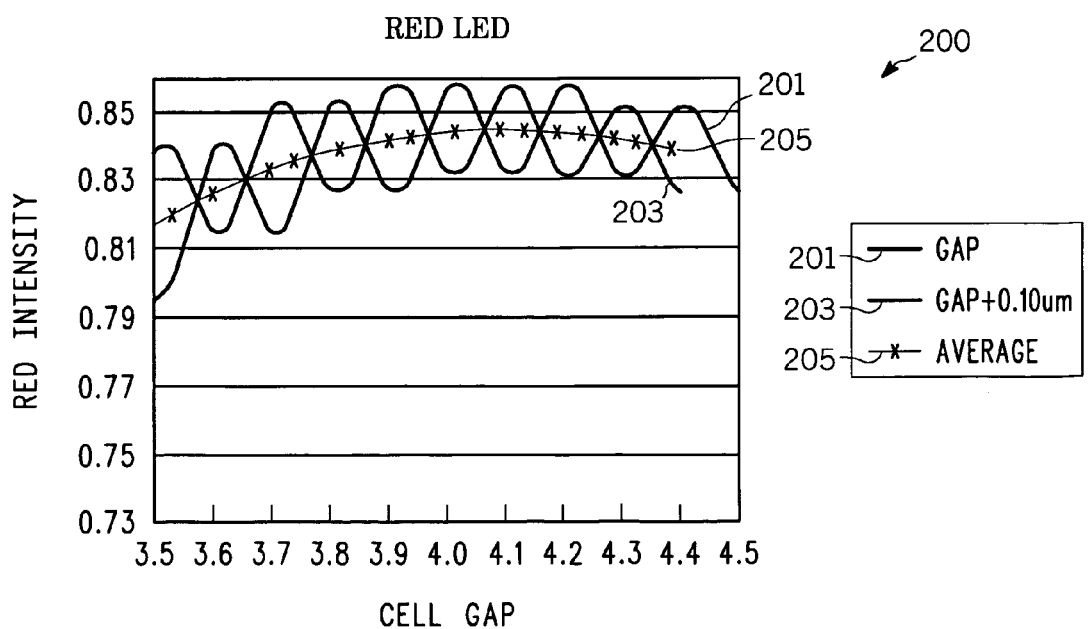
FIG. 7 shows a plot of transmittance of a 90° twisted nematic liquid crystal cell with red LED illumination. The curves are for two path lengths, and the resulting spatial average of these two path lengths.
Figure 8:
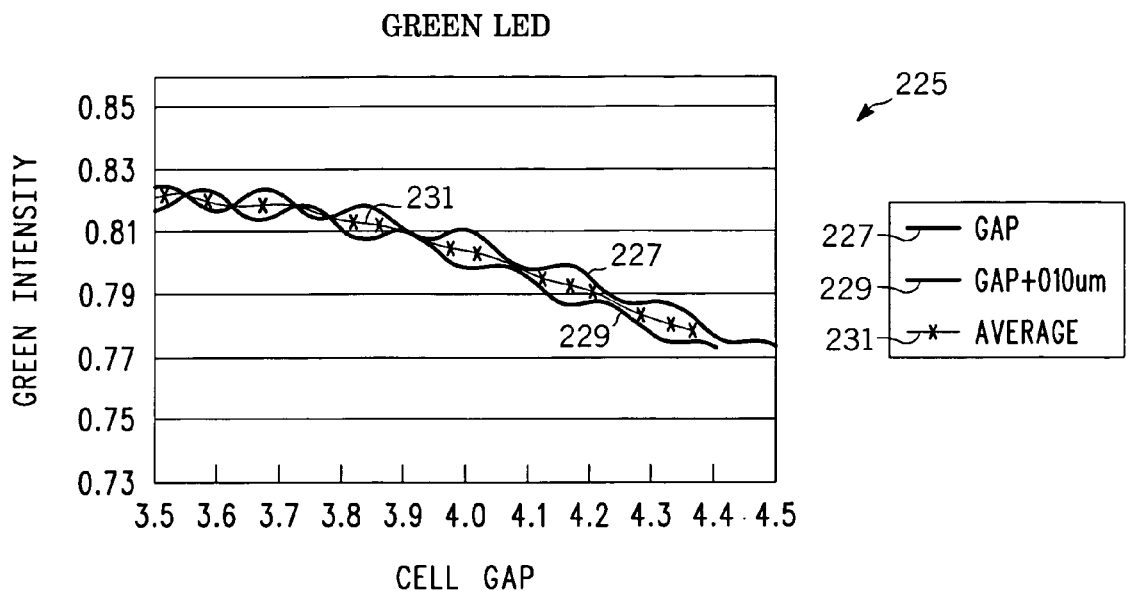
FIG. 8 is a plot as in FIG. 7 except in green illumination.
Figure 9:
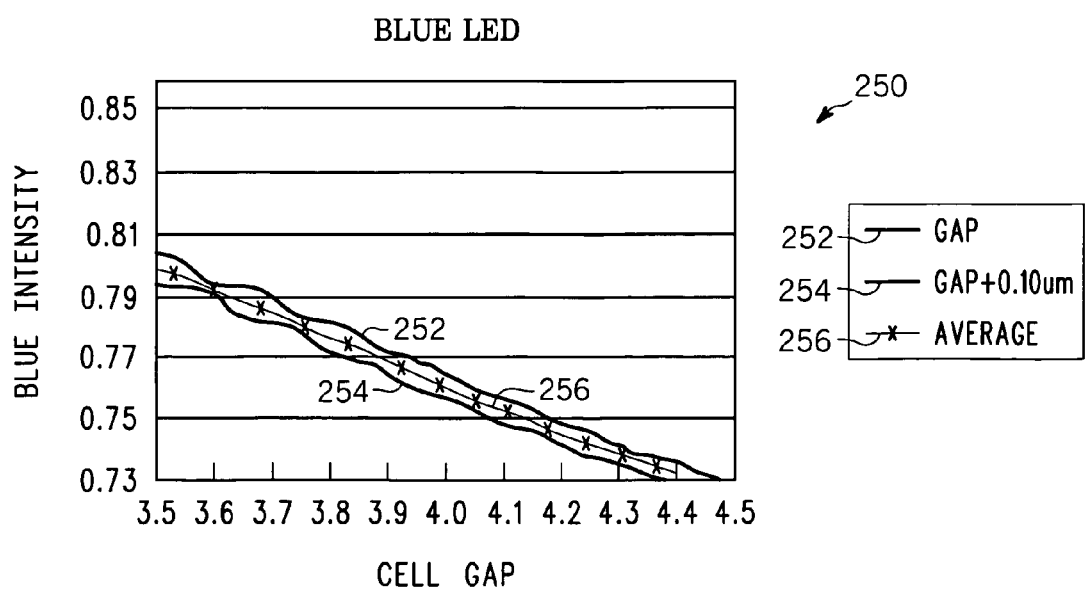
FIG. 9 is a plot as in FIG. 7 except in blue illumination.

An example of this method of determining the optical path length is presented in FIGS. 7, 8 and 9. In this example, a 90° twisted nematic transmissive cell is modeled in the commercial liquid crystal modeling software known as DIMOS. FIG. 7 shows the transmittance of the light from a particular red LED illuminator as a function of cell gap. The three curves 201, 203 and 205 show the transmittance of the cell, the transmittance of the cell with an added 0.2 micron of path, and the result of the spatial averaging of these two contributions. FIG. 8 shows in its graph 225 the same cell modeled with the light from a particular green LED and shows three curves of the transmittance of the cell, which include curve 227 that shows the transmittance of the cell, curve 229 which shows the transmittance of the cell with an added 0.2 micron of path, and the resulting curve 231 which is the average of these two curves. It can be seen that the modulation is less to begin with, and there is also a significant improvement even though the peaks and troughs are not aligned perfectly (because the extra path length in this example was chosen to match the wavelength of the red LED). FIG. 9 shows the same cell modeled in light from the blue LED and includes curves 252, 254 and the spatial average curve 256 which averages the curves 252 and 254.

Figure 10:
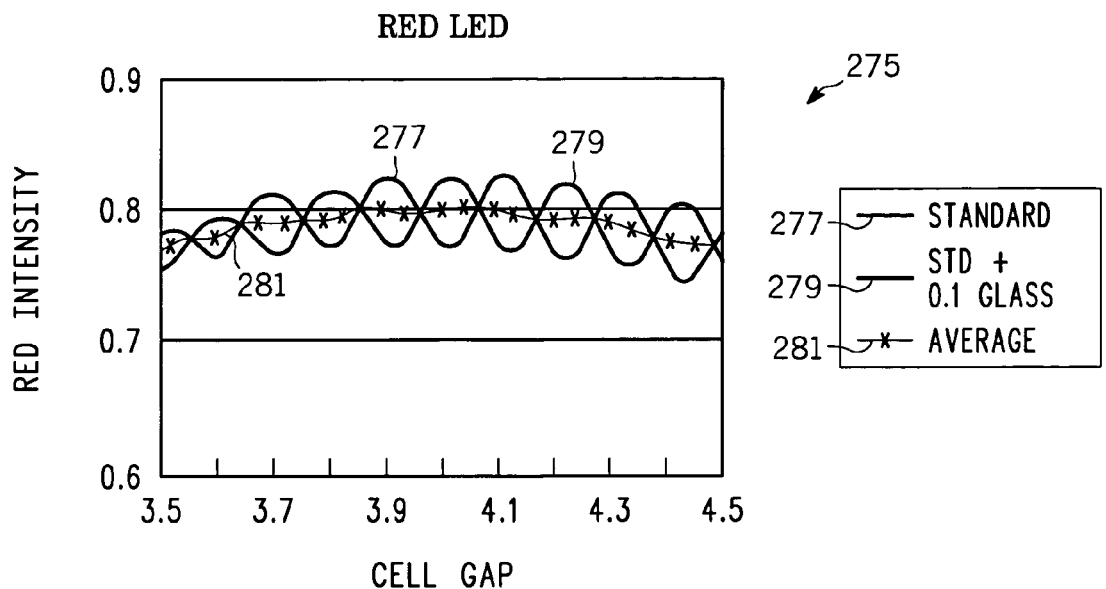
FIG. 10 is a plot of the reflectance of a 45° twisted nematic liquid crystal cell with red illumination. In this case, the different path lengths are created with 0.1 microns of glass.
Figure 11:
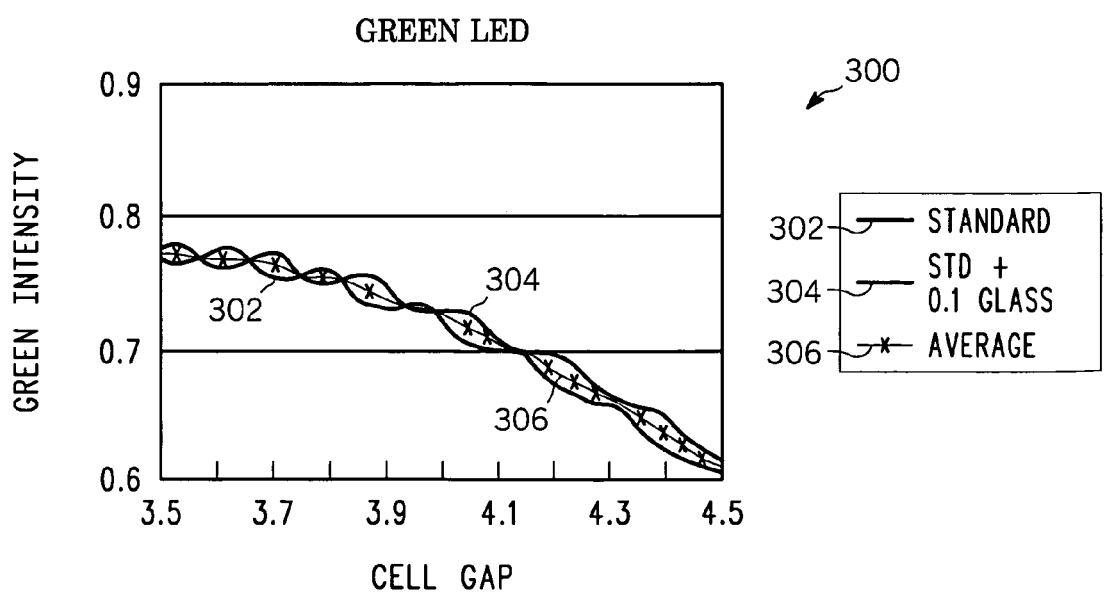
FIG. 11 shows the example shown in FIG. 10 except with green illumination.
Figure 12:
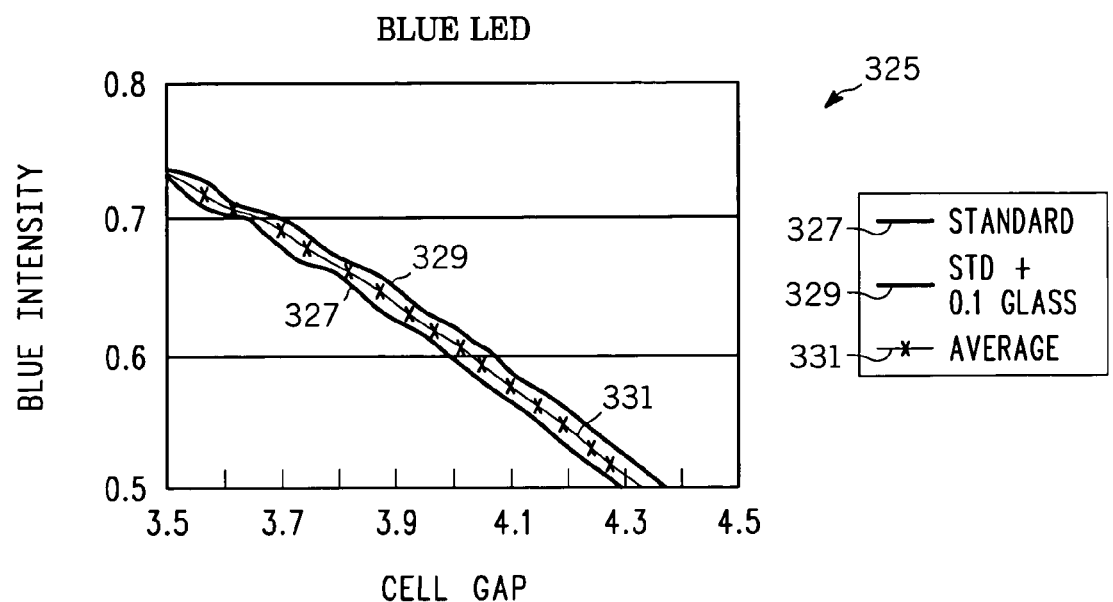
FIG. 12 shows the example shown in FIG. 10 except with blue illumination.

A second example is presented in FIGS. 10, 11, and 12. In this example, a 45° twisted nematic reflective cell is modeled in DIMOS using the same three LED spectra as the previous example. In this case, the optical path length difference is created with a 0.1 micron thick layer of a glass-like material with a refractive index of 1.5 and a dielectric constant of 5.0. The liquid crystal cell gap is the same on both regions of the cell, corresponding to the situation shown in FIG. 4. This particular path length difference results in a dramatic reduction of fringe modulation in both red and green as can be seen from FIGS. 10 and 11, although the choice is biased toward the red, as the modulation from the fringe effect is larger for that color.

There are various different ways to arrange to have different optical path lengths over an area of pixel electrodes. Typically, it is expected that approximately equal areas of two different optical path lengths, which are spaced closely enough to be spatially integrated by the human visual system, will be preferred. While it is quite likely to mean that one will desire to have one area of each path length in each pixel, that may not be required in high resolution displays that are not magnified very much, and conversely, if the pixels are magnified to a large extent, it may be better to have more than one area of each path length on each pixel. Examples of various possible layouts of the different regions of optical path are shown in FIGS. 13-19.

Figure 13:
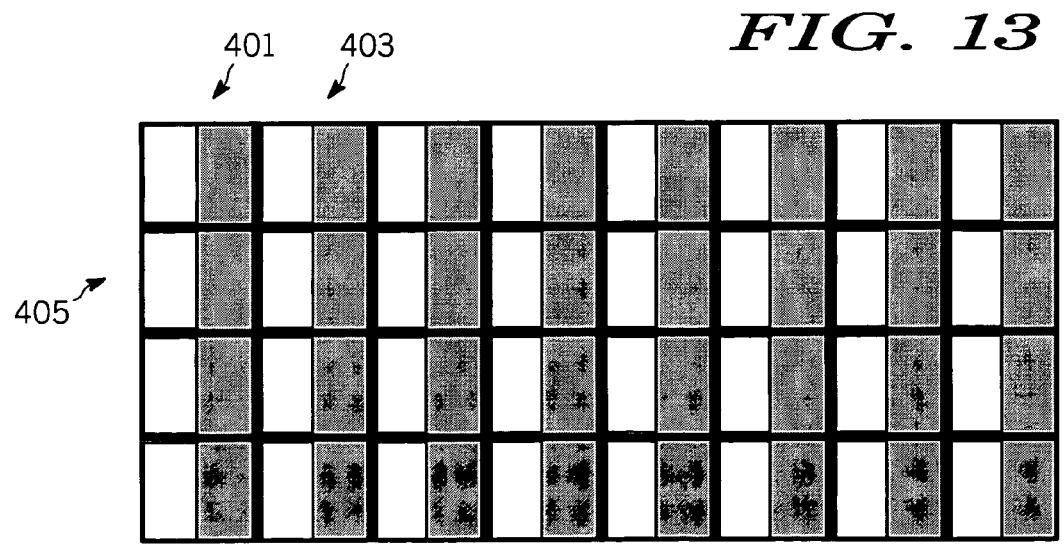
FIG. 13 shows an example pattern of path length differences which may be achieved by having pixel electrodes of different heights relative to a cover glass electrode such as an ITO layer.

FIG. 13 shows one exemplary pattern of path length differences. The pattern 400 is an 8×4 array of pixels, where each pixel has one area of each of the two different path lengths. The different path lengths are illustrated by the white and gray regions. For example, pixels 401, 403 and 405 each have two regions of different optical path lengths. These two different optical path lengths may be created in any of the variety of ways shown above. For example, these path lengths may result from a display having a structure such as that shown in FIG. 5 or a structure shown in FIG. 4 or a structure shown in FIG. 3A or a structure shown in FIG. 6.

Figure 14:
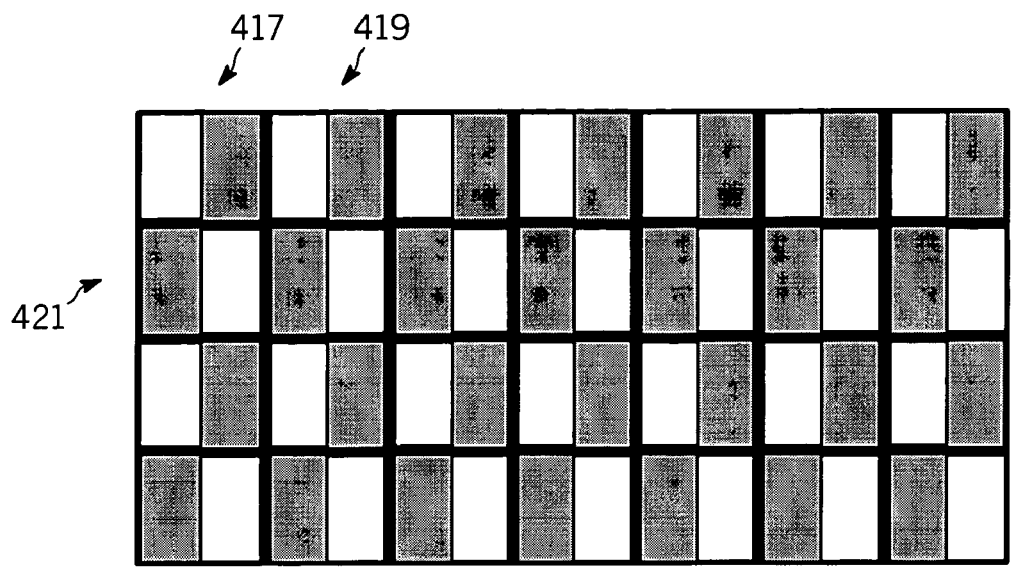
FIG. 14 shows another example pattern of path length differences.

FIG. 14 shows another exemplary pattern of path length differences. In this arrangement of an array of 8×4 pixels, the left and right side of the pixels are of different optical path lengths, but are exchanged from row to row. In this arrangement, it may be expected that the slight luminance difference of the different sides of the pixels will spatially integrate a little better than the example shown in FIG. 13. The exchanging from row to row in the pattern 415 can be seen by comparing pixel 417 to pixel 421 in that the gray region is to the right for pixel 417 and to the left for pixel 421.

Figure 15:
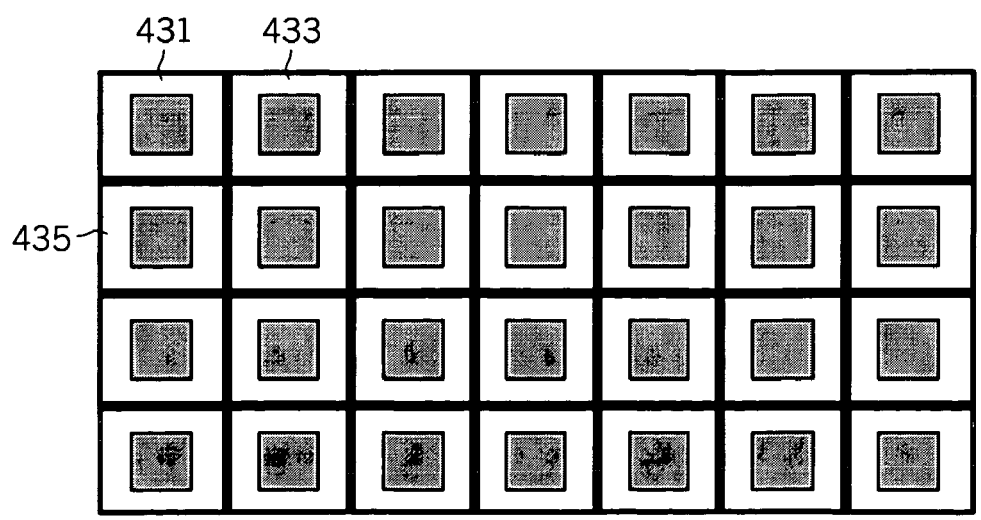
FIG. 15 shows another example pattern of path length differences.

FIG. 15 shows another exemplary pattern 430 of path length differences. In this arrangement, a central region of the pixel has a different optical path length from the edge region of the pixel. This can be seen by observing the gray regions within pixels 431, 433, and 435 relative to the edges of each of these pixels. The pattern 430 is a 7×4 array of pixels. The pattern shown in FIG. 15 has the advantage that the edge of the pixel mirrors, in those embodiments in which the height of the pixel mirrors is varied, are all at the same level, thereby simplifying fabrication.

Figure 16:
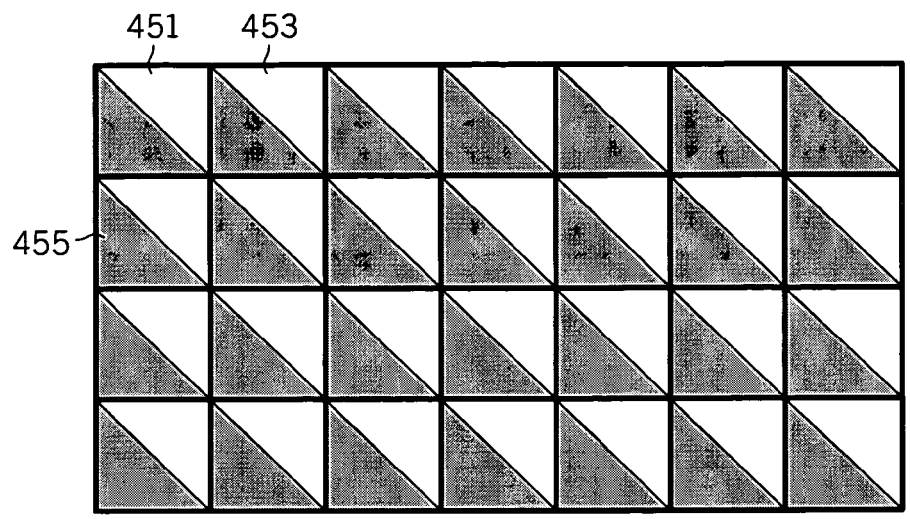
FIG. 16 shows another example pattern of path length differences.

FIG. 16 shows another exemplary pattern 450 of path length differences. In this array of 7×4 pixels shown in the pattern 450, the different optical path length regions are arranged with a diagonal boundary for each pixel. This can be seen in pixels 451, 453 and 455. This may be advantageous if the liquid crystal is aligned diagonally, and if the mechanism for forming the different optical path lengths results in some surface unevenness. The liquid crystal will experience less disruption if it is aligned parallel to this edge.

Figure 17:
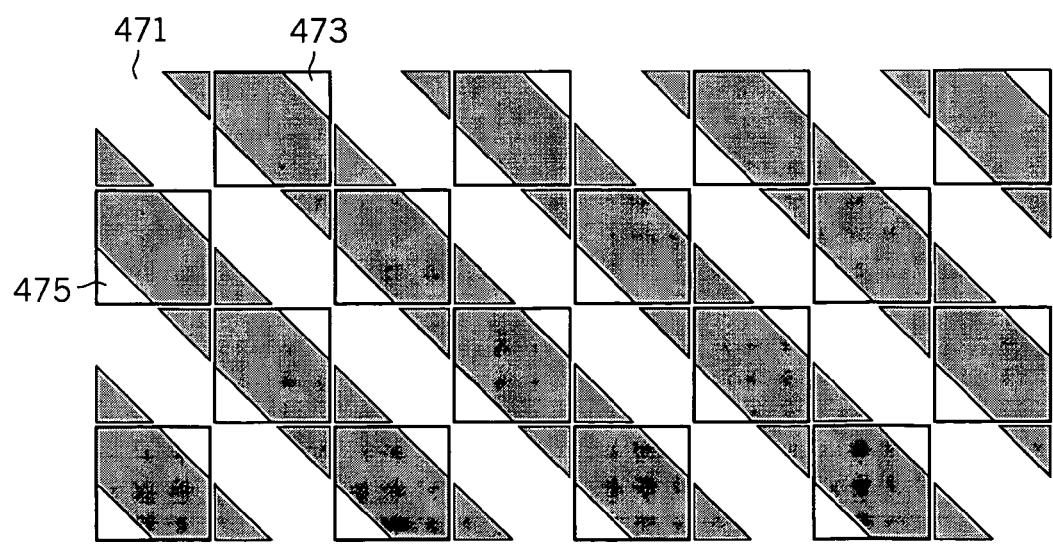
FIG. 17 shows a more elaborate example pattern of path length differences.

FIG. 17 shows another exemplary pattern 470 of path length differences. The pattern 470 shows an array of 8×4 pixels, including pixels 471, 473, and 475. In this arrangement, the different optical path length regions are again arranged with a diagonal boundary. In this case, there are only diagonal boundaries between the areas of different path lengths. Again, this may be advantageous if the liquid crystal is aligned diagonally, and if the mechanism for forming the different optical path length results in some surface unevenness. Typically, it is desirable that each pixel have approximately equal areas of each of the two optical path lengths on each pixel. In the arrangement shown in FIG. 17, each pixel has two regions of one pathlength and one region of another.

Figure 18:
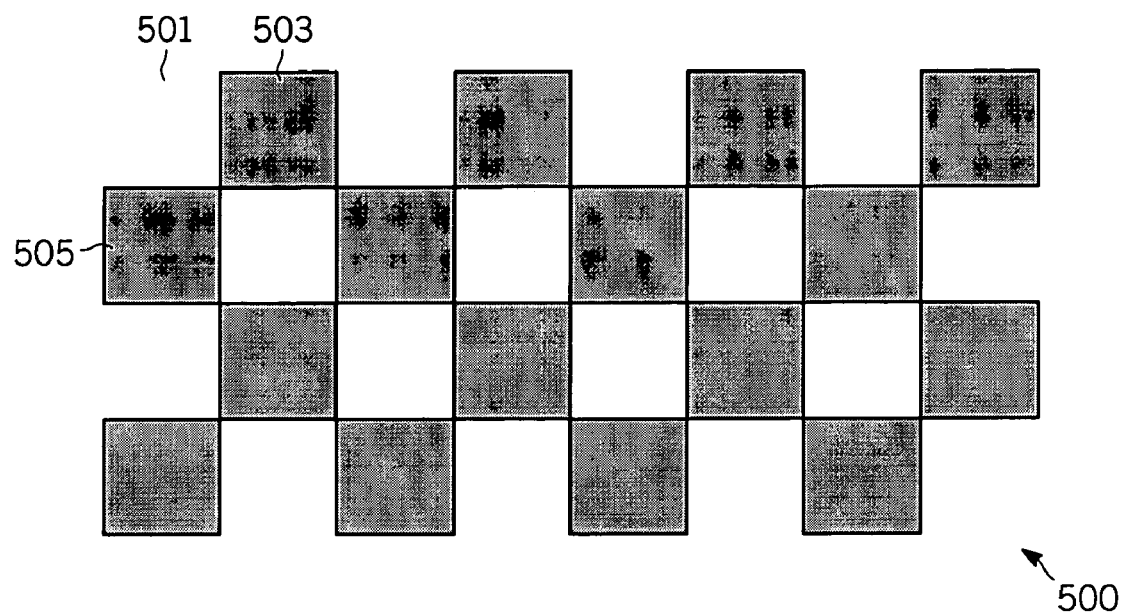
FIG. 18 shows an example pattern of path length differences where the path length differences are designed to be approximately an odd multiple of one-quarter of the wavelength of the light illuminating the pixels.

FIG. 18 shows a particular pattern 500 which includes an array of 8×4 pixels including pixels 501, 503, and 505. The pattern 500 represents a situation in which entire pixels are arranged to be alternatively of different optical path length. They are shown in a checkerboard arrangement, but alternatives, including vertical or horizontal stripes, could also be utilized. This could be done in situations where the magnification is low enough that the relatively low fringe induced modulation on individual pixels is not perceptible. This could also be extended to larger groups of pixels. An example of a pattern of larger groups of pixels is a 2 by 2 square of pixels set to one path length, and a neighboring square of 2 by 2 pixels set to the other path length. These 2 by 2 squares of pixels could be interspersed in, for example, a checkerboard pattern. This approach of setting entire pixels to one path length or the other may benefit optical efficiency because there is no region inside the pixel that is undergoing a step in path length. This step region can scatter some light out of the optical system and cause some loss of efficiency.

If entire pixels are arranged to contain a single path length, there is a possibility that certain displayed images may interact with the pattern of path-lengths in such a way as to cause fringes to become visible; e.g. if a fine checkerboard pattern was displayed on a pixel array that had a corresponding fine checkerboard pattern of pixel path-length differences. In this example, the different gray levels being displayed as the two colors of the checkerboard might be sufficiently different in their electro-optic responses to path-length changes that the cancellation phenomenon might break down. An example of this break down could be where the image is made of alternating blue and red pixels arranged in a checkerboard pattern, and the pixels of different pathlengths are also arranged in a matching checkerboard pattern. It is possible that the red pixels could have a larger fringe modulation, as a function of cell gap, than the blue pixels and so the intensity variations seen on the red pixels would not be properly cancelled by the compensating variations on the blue pixels. Furthermore, even if the fringe modulations were similar so the intensities did cancel well, this example shows that there would be a fringe induced color shift. This is because where the overall cell gap causes the pixels that are red to be brighter; they are compensated by intermingled dimmer blue pixels. Similarly, where the overall cell gap is different and the blue pixels are brighter, they are compensated by dimmer red pixels. In this example the fringe pattern would cause a color shift. This behavior is caused by the correlation between the applied image data, and the underlying pixel path-length pattern. The solution to this problem is to choose an irregular pattern for determining which pixel is assigned which path-length in the pixel array., The irregular pattern is much less likely to be correlated with the image data, and so is much less likely to be prone to interactions with image data. It is, of course, possible to find a particular pathological image for any given pattern of pixel path lengths but the point is that this is very unlikely to occur in the normal course of events.

Figure 20:
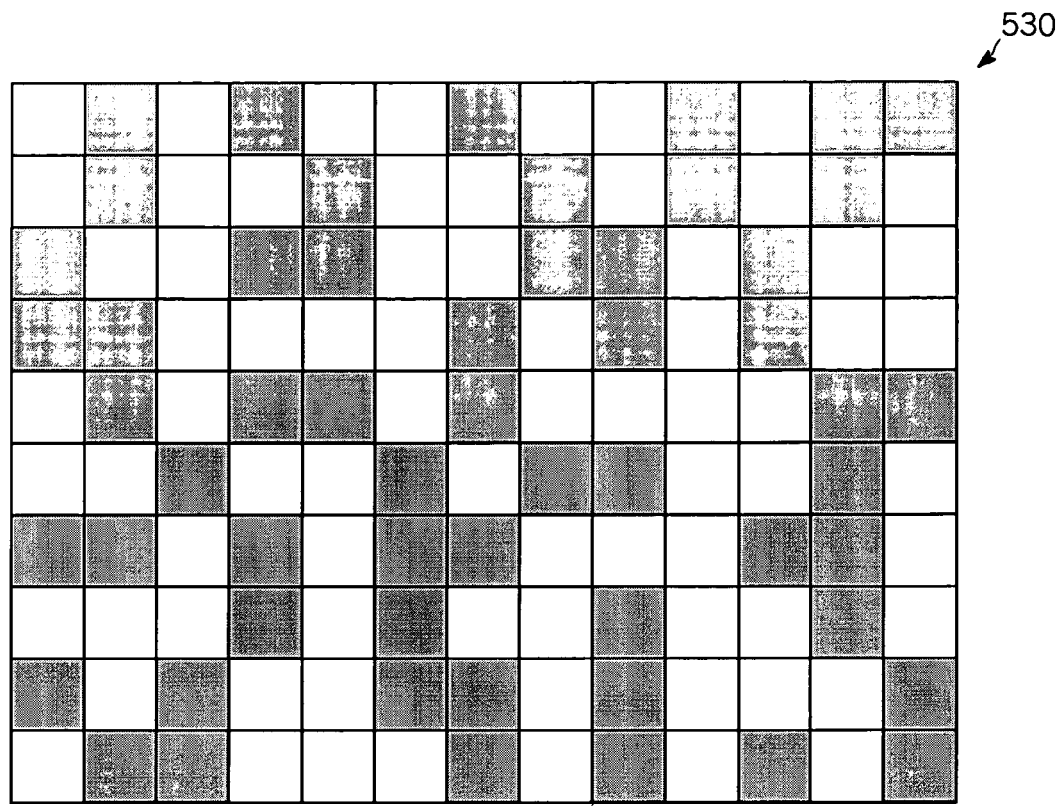
FIG. 20 shows an example pattern of path length differences where entire pixels are set to one path length or the other, and the distribution of these path lengths is arranged irregularly over the pixel electrode array.
Figure 21:
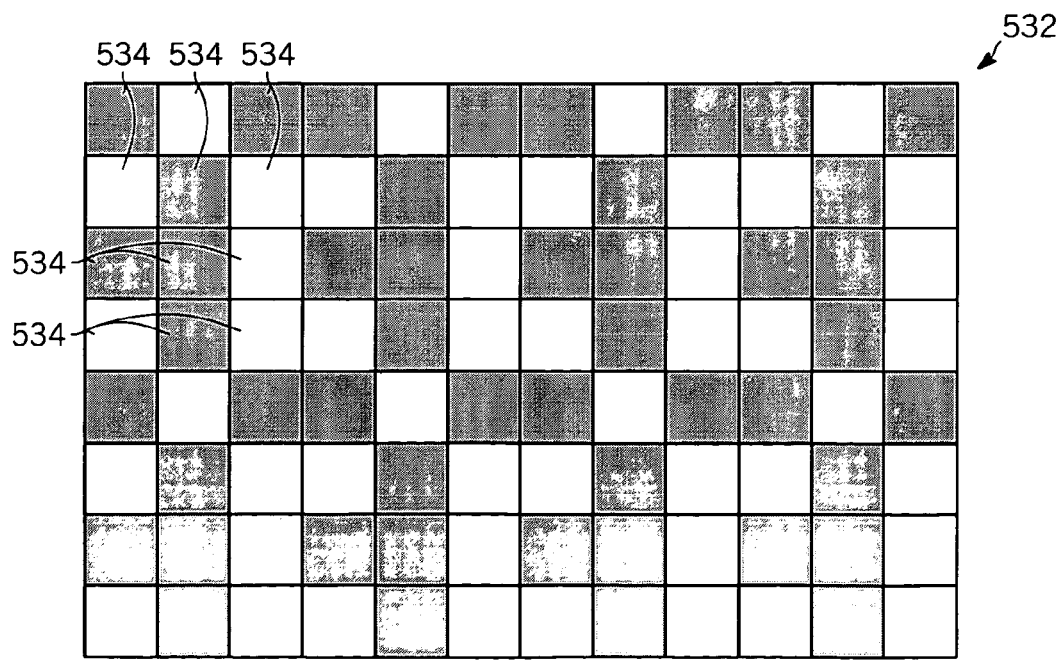
FIG. 21 shows an example pattern of path length differences where entire pixels are set to one path length or the other, and the distribution of these path lengths is arranged irregularly in a pixel electrode sub-array which is then repeated over the pixel array.

The irregular pattern can be generated either by making a cell with an irregular distribution of the path lengths and replicating it, or by making the entire array with such an irregular distribution. These two approaches are illustrated in FIGS. 20 and 21. For example, FIG. 20 shows an irregular pattern of pixels 530 with different path lengths. FIG. 21 illustrates an array of pixels 532 comprised of a plurality of 3×4 irregular pixel sub-arrays. For example, the 3×4 irregular pixel sub-array comprised of pixels 534 is repeated several times throughout pixel array 530. The irregular pattern can be chosen manually or by computer. In either approach, care should be taken that approximately equal quantities of each path length are use, and that no significant areas with too large a number of one particular path length are allowed. Such areas may show up as patches that are lighter or darker than the surrounding area.

Figure 19:
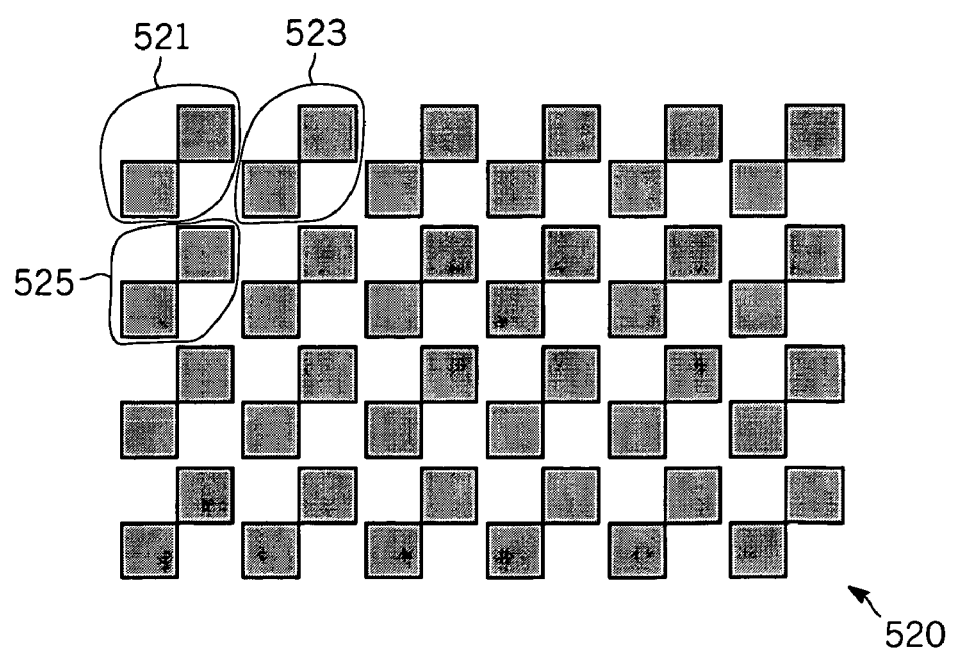
FIG. 19 shows another example pattern of path length difference where each pixel has four regions for producing path length differences for a single pixel.

FIG. 19 shows another exemplary pattern 520 of path length differences. In this example, each individual pixel has more than one area of each path length. For example, pixels 521, 523 and 525 each have four regions, which may be four pixel electrode surfaces where two of the regions have one path length and two of the other regions have another path length. The pattern 520 shows an array of 6×4 pixels. This pattern 520 may be useful if the pixels are magnified to a large extent, and the small differences may be perceptible.

The particular spatial pattern of optical path length difference does not necessarily have to be correlated to the spatial pattern of the pixels. The pattern of regions of optical path length difference, for example, could be randomly or pseudo randomly distributed over the regular array of pixel electrodes. For fringe reduction it is only important that the regions of optical path length difference be spaced closely enough on the average to be spatially integrated by the human visual system.

Whichever arrangement of path length changes is chosen, it may be advantageous to build path length changes outside the pixel array in the adjacent peripheral area. This area may be visible to the user of the display, and fringes in this area may also be visible. By constructing a pattern of path length variations in the peripheral region, the invention can be used to suppress the visibility of fringes in the peripheral region. The pattern in the peripheral area could simply be a continuation of the pattern used over the pixel array, or it could be a different pattern that is chosen specifically for the peripheral region. For example, the peripheral region may be used for adhesive deposition, and irregularities in the surface may affect how the adhesive spreads as the device is assembled. It may be preferable to use a pattern where path length differences are arranged in stripes parallel to the adhesive seal to help prevent flow of the adhesive towards the pixel area.

In the foregoing specification, the invention has been described with reference to specific exemplary embodiments thereof It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A display system, comprising:
   a first electrode;
   a first substrate having first and second pluralities of pixel electrodes; and
   an electro-optic layer operatively coupled to said first electrode and having a first thickness between said first electrode and said first plurality of pixel electrodes and having a second thickness between said first electrode and said second plurality of pixel electrodes, wherein the difference between electro-optic thicknesses dispersed between closely spaced pixels is an odd multiple of a one-quarter wavelength of light which illuminates said first and second pluralities of pixel electrodes, and said first and second pluralities of pixel electrodes forming an irregular pattern.

2. A display system according to claim 1 wherein said electro-optic layer comprises a liquid crystal material which is disposed between said first electrode and said first substrate and wherein said first electrode is a common counter electrode.

3. A display system according to claim 2 wherein each of said first and second pluralities of pixel electrodes comprises a reflector.

4. A display system according to claim 1 wherein said display system is a reflective micro display.

5. A display system according to claim 1 wherein said first plurality of pixel electrodes and said second plurality of pixel electrodes are illuminated with the same color light.

* * * * *